(12) United States Patent
Johnson, Jr.

(10) Patent No.: US 6,626,985 B1
(45) Date of Patent: *Sep. 30, 2003

(54) MATTE INK COMPOSITION AND METHOD OF USE

(75) Inventor: Steve Johnson, Jr., Birmingham, AL (US)

(73) Assignees: Victory Ink Company, Inc., Birmingham, AL (US); Commercial Printing Company, Inc., Birmingham, AL (US)

( * ) Notice: Subject to any disclaimer, the term of this patent is extended or adjusted under 35 U.S.C. 154(b) by 7 days.

This patent is subject to a terminal disclaimer.

(21) Appl. No.: 09/853,433

(22) Filed: May 10, 2001

Related U.S. Application Data

(63) Continuation-in-part of application No. 09/309,112, filed on May 10, 1999, now Pat. No. 6,245,136.

(51) Int. Cl.$^7$ ................................................ C09D 11/00
(52) U.S. Cl. ................ 106/31.34; 106/31.4; 106/31.66; 106/31.72
(58) Field of Search ........................... 106/31.34, 31.4, 106/31.66, 31.72

(56) References Cited

U.S. PATENT DOCUMENTS

| | | | |
|---|---|---|---|
| 3,844,819 A | | 10/1974 | Windle |
| 4,127,420 A | | 11/1978 | Harris et al. |
| 4,239,832 A | | 12/1980 | Barouh et al. |
| 4,304,601 A | | 12/1981 | Sharp |
| 4,695,613 A | | 9/1987 | Olbrich et al. |
| 5,173,113 A | * | 12/1992 | Sugerman et al. .......... 106/252 |
| 5,215,814 A | * | 6/1993 | Gager et al. ................. 427/209 |
| 5,298,335 A | | 3/1994 | Reed et al. |
| 5,382,282 A | | 1/1995 | Pennaz |
| 5,521,002 A | | 5/1996 | Sneed |

* cited by examiner

Primary Examiner—Mark L. Bell
Assistant Examiner—Veronica F. Faison
(74) Attorney, Agent, or Firm—Smith, Gambrell & Russell, LLP

(57) ABSTRACT

A matte ink composition and method for using the composition to produce a superior matte-gloss contrast finish. The matte ink composition comprises (1) an oleoresinous component, (2) a matte agent to impart a matte finish, (3) a cobalt catalyst to accelerate drying of the composition, and (4) an etching agent to condition a gloss surface to promote adherence of the ink composition to the gloss surface. To prepare a matte-gloss finish according to the present invention, a printing substrate is first coated with a gloss film lamination and, after the gloss coating has adequately dried, the matte ink composition of the present invention is lithography printed onto the gloss surface. This novel matte ink composition provides a superior inatte-gloss contrast finish without the need for specialized UV equipment and procedures. Further, the matte ink composition of the present invention and its method of use allow substantially finer matte-gloss contrast detailing than attainable by presently used UV ink compositions and methods for forming a matte-gloss finish.

21 Claims, No Drawings

US 6,626,985 B1

MATTE INK COMPOSITION AND METHOD OF USE

RELATED MATERIALS

The present application is a continuation-in-part application of Ser. No. 09/309,112, now U.S. Pat. No. 6,245,136, filed May 10, 1999, which is incorporated herein by reference.

FIELD OF THE INVENTION

The present invention relates to a matte ink composition for use in lithography printing. More particularly, the present invention relates to a matte ink composition having superior adherence properties for printing directly onto a gloss surface. Further, the present invention relates to a method of forming a superior matte-gloss contrast finish without the need for specialized UV equipment and procedures.

BACKGROUND OF THE INVENTION

In a lithography printing process, one or more printing plates are used to transfer ink to a printing substrate, with one plate for every ink composition used. A lithography plate has two regions: an oleophilic image area for receiving an oil-based ink and an oleophobic non-image area for receiving a water-based, non-imaging solution, known in the art as a "fountain" solution. During the printing process, the ink and fountain solution are applied to a printing plate and allowed to gravitate to their respective areas. The ink can be transferred directly to the substrate or it can be transferred to an intermediate "blanket" cylinder and subsequently transferred to the substrate, the latter being known in the art as offset lithography printing.

As with other printing inks, lithography printing inks are designed according to several criteria, including the desired visual characteristics of the printed material, the printing process which will be used, the drying conditions of the ink, the substrate to which the ink must adhere, and the wear resistance of the ink. While an ink may include various pigments to achieve a desired visual effect, an ink may also be designed to achieve other visual effects, such as a gloss or matte (dull) effect. A gloss effect occurs when incident light is reflected and a matte effect occurs when incident light is scattered. A popular visual effect is a combination matte-gloss contrast finish, which is particularly popular for magazine, book, and periodical covers. In this case, the matte and gloss coatings, both of which are preferably transparent, are printed over the pigmented ink coatings, if present.

To achieve a combination matte-gloss contrast finish according to present lithography printing methods, a substrate is first printed with a matte ink composition in selective areas where a matte effect is desired, after which, a gloss ink composition is printed onto the substrate in selective areas where a gloss effect is desired. The matte and gloss coatings normally do not overlap. While the matte and gloss coatings can be applied immediately following application of any pigmented ink(s), it is preferable to apply the matte and gloss coatings after the underlying coatings have dried. Nonetheless, in either case this process produces only a moderate contrast between the matte and gloss surfaces.

To achieve a superior matte-gloss contrast finish, another process has developed in which the substrate is first coated with a plastic matte film lamination. Because inks do not readily adhere to plastic films, a specialized gloss ink is used wherein the ink is selectively "spot" coated thereon and cured to the matte surface via ultra-violet (UV) radiation. Although this UV process produces a greater matte-gloss contrast than that seen from the offset lithography process, the gloss coating is not very durable and has a tendency to detach from the matte surface if the coated substrate is stressed, for example, by folding or creasing. Moreover, UV curing processes require specialized equipment (e.g. photopolymer plates or silk screens) and procedures that are both time consuming and expensive. Consequently, most lithography printing companies cannot afford the specialized UV equipment and must send their products to a printing company having the specialized UV equipment for application of the gloss coating, a detour which substantially increases production time and costs.

Other problems with the UV process includes that the photopolymer plates and silk screens are very coarse and it is extremely difficult to print fine detail. Accordingly, the detail available with the UV process is substantially inferior than that available with lithography printing. Also, with silk screens, it is difficult to regulate the amount of UV coating that is being applied to the sheet. Finally, since the UV process is somewhat different than the lithographic process, it is difficult to achieve proper registration between the gloss coating and the graphics that have been lithography printed on the substrate.

Accordingly, what is needed is a novel ink composition and method of use which overcome the problems in the prior art and which provide a superior matte-gloss contrast finish without the need for specialized UV equipment and procedures, wherein the overlay finish coat will not detach from the base finish coat when stressed.

SUMMARY OF THE INVENTION

It is an object of the present invention to provide a matte ink composition for use in lithography printing.

It is another object of the present invention to provide a matte ink composition which has superior adherence properties for printing directly onto a gloss surface.

It is another object of the present invention to provide a matte ink composition which will not detach from a gloss surface when stressed, for example, by folding or creasing.

It is another object of the present invention to provide a method for producing a superior matte-gloss contrast finish without specialized UV equipment and procedures.

It is another object of the present invention to provide an ink composition and method for producing a superior matte-gloss contrast finish having substantially finer detail than matte-gloss finishes available by prior art methods.

These and other objects of the present invention are accomplished with a novel matte ink composition and method for using the composition to produce a superior combination matte-gloss finish. The matte ink composition comprises (1) an oleoresinous component, acting as both a vehicle for the other ink components and a quickset agent to promote a durable, wear resistant coating when dried, (2) a matte agent to impart a matte finish, (3) a cobalt catalyst to accelerate drying of the composition, and (4) an etching agent to condition the gloss surface to promote adherence of the ink composition to the gloss surface. Optional ingredients include (5) a plasticizer to promote flexibility of the dried ink composition without cracking or blistering, (6) a manganese drying agent to aid in drying of the composition, and (7) a wax compound to increase rub resistance and to impart slip.

To prepare a matte-gloss finish according to the present invention, a printing substrate is first coated with a gloss film lamination and, after the gloss coating has adequately dried, the matte ink composition of the present invention is lithography printed onto the gloss surface. It is important to note that the matte ink is printed over the gloss film lamination, which is opposite the UV method in which the gloss ink is printed over the matte film lamination. This novel matte ink composition provides a superior combination matte-gloss contrast finish without the need for specialized UV equipment and procedures. Thus, a superior matte-gloss contrast finish can be produced with offset lithography equipment and film lamination equipment, thus greatly decreasing the cost and time associated with presently used ink compositions and methods for producing a quality matte-gloss finish. Finally, the matte ink composition of the present invention and its method of use allow substantially finer matte-gloss contrast detailing than attainable by the presently used UV ink compositions and methods for forming a matte-gloss finish.

These and other objects and advantages of the invention will become apparent from the following detailed description of the preferred embodiment of the invention.

DETAILED DESCRIPTION OF THE PREFERRED EMBODIMENT

The ink composition of the present invention finds primary use in offset lithography printing, however, the composition and method may be used or modified for application in other related printing methods, such as direct plate to substrate lithography printing or letterpress printing, and, therefore, the present invention includes any foreseeable modifications for use in related printing methods. A detailed description of offset lithography printing and the ink compositions used therein will not be set forth herein, however, numerous publications are available that teach in detail the equipment, procedures, and materials used in an offset lithography printing operation. Two such publications are *The Printing Ink Manual*, $4^{th}$ Edition (1988), published by Van Nostrand Reinhold (International) Co. Ltd., and *The Lithographers Manual*, $7^{th}$ Edition (1983), published by The Graphics Arts Technical Foundation, Inc., both of which are incorporated herein by reference.

INK COMPOSITION

The major component of a lithographic ink composition is known as a lithographic ink varnish or vehicle, which comprises a resin and an oil component. The oil component primarily acts as a carrier for the resin component, although it has other actions as well, such as an effect on the drying time of the ink composition. The resin component binds the various ink components together and to the substrate once the ink is dried. The resin also imparts other properties, such as hardness, wear resistance, and drying time. Lithographic ink varnishes are comprised of two main classes of inks based on the method used for drying the ink: (1) an oleoresinous ink composition, which is dried by oxidation, absorption, or solvent evaporation, and (2) an acrylic ink composition, which is dried by radiation curing, such as UV or electron beam. The present invention is directed to oleoresinous ink compositions.

The resins and oils in the oleoresinous varnish component of the present invention may include any natural and/or synthetic resins (e.g. phenolic, alkyd) and oils (e.g. linseed, tung) appropriate for use in lithographic inks. The matte ink composition of the present invention comprises at least 4 ingredients: (1) between 75–90%, preferably 80–85%, of an oleoresinous component, which acts as both a vehicle for the other components and a quickset agent to promote a durable, wear resistant coating when dried, (2) between 10–25%, preferably 15–20%, of a matte agent, preferably fumed silica, to impart a matte finish, (3),between 0.1–10%, preferably 1–2%, of a cobalt catalyst to accelerate drying of the composition, and (4) between 0.1–10%, preferably 1–3%, of an etching agent, preferably isophorone, to condition the gloss surface to promote adherence of the ink composition. An excessive amount of the oleoresinous component prevents adequate inclusion of other ingredients, thereby reducing adhesion, matte effect and drying time, and an insufficient amount results in poor wear resistance. An excessive amount of the matte agent interferes with adhesion, wear resistance, and drying time, and an insufficient amount results in inadequate dullness. An excessive amount of the cobalt catalyst results in unreacted catalyst, thereby interfering with drying, and an insufficient amount slows drying time considerably. An excessive amount of the etching agent interferes with drying and an insufficient amount results in poor adherence to the gloss surface. The etching agent in the preferred embodiment is isophorone, although other etching agents may be used with the present invention, including acetone, cyclohexanone, diacetone alcohol, ethyl acetate, isopropyl acetate, methyl ethyl ketone, methyl iso-butyl ketone, n-butyl acetate, toluene, and xylene. Optional ingredients include (5) a plasticizer to promote flexibility of the dried ink composition without cracking or blistering, (6) a manganese drying agent to aid in drying of the composition, and (7) a wax compound to increase rub resistance and to impart slip.

An example of the matte ink composition utilizing products available in the industry is set forth below as example 1. Note that the oleoresinous ingredient overlaps two components: (1) a varnish base having the matte agent included therein, and (2) a quickset agent comprising resins and oils particularly selected to promote a durable, wear resistant coating when dried.

EXAMPLE 1

1. between 20–90%, preferably 60–65%, of OPTEX OMB-2232 (Day-Glo Color Corp. of Cleveland, Ohio), a matte overprint varnish base made of hard resins, drying oil/alkyd, petroleum distillate, and a matte agent (fumed silica, 10–20%);
2. between 10–75%, preferably 32–36%, of Q-6535 (Lawter International, Inc. of Kenosha, Wis.), a quickset agent made of hard resins and drying oil/alkyd;
3. between 0.1–10%, preferably 1.5%, of a cobalt neodecanoate mixture, 12% cobalt (The Shepherd Chemical Company of Cincinnati, Ohio), a drying agent; and
4. between 0.1–10%, preferably 2%, of isophorone (Union Carbide Corp. of Danbury, Conn.), an etching agent.

Another example of the matte ink composition utilizing products available in the industry is set forth below as example 2, wherein the example includes optional additives. Again, the oleoresinous ingredient overlaps two components: (1) a varnish base having the matte agent included therein, and (2) a quickset agent comprising resins and oils particularly selected to promote a durable, wear resistant coating when dried.

EXAMPLE 2

1. between 20–90%, preferably 50–55%, of OPTEX OMB-2232 (Day-Glo Color Corp. of Cleveland, Ohio), a matte overprint varnish base made of hard resins, drying oil/alkyd, petroleum distillate, and a matte agent (fumed silica);

2. between 10–75%, preferably 32–36%, of Q-6535 (Lawter International, Inc. of Kenosha, Wis.), a quick-set agent made of hard resins and drying oil/alkyd;

3. between 0.1–10%, preferably 1.5%, of a cobalt neodecanoate mixture, 12% cobalt (The Shepherd Chemical Company of Cincinnati, Ohio), a drying agent;

4. between 0.1–10%, preferably 2%, of isophorone (Union Carbide Corp. of Danbury, Conn.), an etching agent;

5. between 0–25%, preferably 5%, of Q-4810 (Lawter International, Inc. of Kenosha, Wis.), a plasticizer made of linseed/tung oil copolymer alkyd;

6. between 0–20%, preferably 2%, of manganese tallate, 6% manganese (The Shepherd Chemical Company of Cincinnati, Ohio), a drying agent; and 7. between 0–20%, preferably 4%, of POLYTECH (Carroll Scientific, Inc. of Countryside, Ill.), a polyethylene wax compound; or between 0–20%, preferably 2%, of CC-6680D (Carroll Scientific, Inc. of Countryside, Ill.), a polytetrafluoroethylene wax compound.

All the ingredients of the ink composition are weighed, combined, blended, and analyzed for quality assurance in accordance with industry standards. If the composition passes the quality assurance analyses, it is milled to remove air and other contaminates, and then packaged for use.

METHOD OF USE

In the lithography printing process, the graphics for the product are first developed. This includes determining the number of colors desired. A printing plate is prepared for each ink composition to be applied to a printing substrate (e.g. paper), including a plate for the matte ink. Normally, a 4-color process is used with the 4 basic printing colors: black, cyan, magenta, and yellow. However, any number of colored inks can be used in any combination. It should be noted that the printing substrate does not have to be color printed prior to application of the matte-gloss finish, in which case the matte and gloss coatings do not need to be transparent.

The plates are placed in the printing press in the order of printing. The printing press comprises a series of in-line printing units. Normally, the plate that will print black is placed on the first printing unit, the plate that will print cyan on the second printing unit, the plate that will print magenta on the third printing unit, and the plate that will print yellow on the fourth printing unit. The matte finish plate is preferably placed in a separate printing press so that the colored inks can be printed without interruption and allowed to dry before applying the matte-gloss finish.

Once mounted on their respective plate cylinders, each plate will make contact with a dampening roller for applying a fountain solution to the non-image area of the plate and an ink roller for applying the ink composition to the image area of the plate. In offset lithography printing, the plate will subsequently contact a blanket cylinder made of a rubber-like material that transfers the ink from the plate to the printing substrate. The printing substrate is pressed against either the plate or the blanket cylinder by an impression cylinder to transfer the ink to the substrate. A printing press operator adjusts the positions of each plate, if needed, so that the image printed on the substrate from each plate registers to each other, and makes any adjustments to the amount of ink or fountain solution that is applied to the plate to obtain the correct pattern.

Each ink is applied in succession until all the inks have been applied. As mentioned above, it is preferable to allow the colored inks to dry before applying the finish. The finish of the present invention includes a gloss plastic film laminate and a matte overprint ink. The gloss plastic film (e.g. polypropylene, polyester, nylon, etc.) is first applied with film lamination equipment which is well known and commonly used in the industry. When used, film laminations are typically applied over the substrate to protect the substrate from abrasion, water damage, etc. The gloss film can be any realistic thickness, although a thickness of 1–2 mil is preferable. After the gloss coating has adequately dried, the matte ink composition of the present invention is lithography printed thereon. The finish completely dries within 24 hours with no special drying equipment. The matte composition forms a strong bond to the gloss surface which will not detach under normal stress conditions.

Using a lithographic plate for printing the matte coating over the gloss coating allows proper registration with any printed graphics on the substrate and a printing detail with screen values of 150–175 lines, such that fine screens and small type can be processed substantially easier than with the UV coating process, which generally only allows screen values of up to 100 lines. Since the process of the present invention uses common lithographic and laminating equipment, any lithography printer will be able to use the method without having to purchase expensive UV equipment or send their products to a printer having the specialized UV equipment. The end result is a less expensive, better quality, and more durable matte-gloss contrast finish compared to those presently available in the printing industry.

It is to be understood that the form of the invention shown is a preferred embodiment thereof and that various changes and modifications may be made therein without departing from the spirit of the invention or scope as defined in the following claims.

Having set forth the nature of the invention, what is claimed is:

1. A matte printing ink composition for adhering to a gloss plastic film surface, comprising:
   a. an oleoresinous compound;
   b. a matte agent to impart a matte finish;
   c. a cobalt drying agent to accelerate drying of the composition; and
   d. an etching agent to condition the gloss surface to promote adherence of the ink composition thereto, wherein said etching agent is selected from a group consisting of acetone, cyclohexanone, diacetone alcohol, ethyl acetate, isophorone, isopropyl acetate, methyl ethyl ketone, methyl iso-butyl ketone, n-butyl acetate, toluene, and xylene.

2. A matte ink composition according to claim 1, wherein said oleoresinous compound is present in said composition between about 75–90% by weight.

3. A matte ink composition according to claim 2, wherein said oleoresinous compound is present in said composition between about 80–85% by weight.

4. A matte ink composition according to claim 1, wherein said matte agent is present in said composition between about 15–20% by weight.

5. A matte ink composition according to claim 1, wherein said matte agent is fumed silica.

6. A matte ink composition according to claim 1, wherein said cobalt drying agent is present in said composition between about 0.1–10% by weight.

7. A matte ink composition according to claim 6, wherein said cobalt drying agent is present in said composition between about 1–2% by weight.

8. A matte ink composition according to claim 1, wherein said etching agent is present in said composition between about 0.1–10% by weight.

9. A matte ink composition according to claim 8, wherein said etching agent is present in said composition between about 1–3% by weight.

10. A matte ink composition according to claim 1, further comprising a plasticizer to promote flexibility of the dried ink composition without cracking or blistering.

11. A matte ink composition according to claim 10, wherein said plasticizer is present in said composition between about 0–25% by weight.

12. A matte ink composition according to claim 1, further comprising a manganese drying agent to aid in drying of the composition.

13. A matte ink composition according to claim 12, wherein said manganese drying agent is present in said composition between about 0–20% by weight.

14. A matte ink composition according to claim 1, further comprising a wax compound to increase rub resistance and to impart slip.

15. A matte ink composition according to claim 14, wherein said wax compound is present in said composition between about 0–20% by weight.

16. A method for forming a matte-gloss contrast finish on a substrate, comprising the steps of:

a. laminating a gloss plastic film over the substrate surface; and b. lithography printing a matte ink composition onto preselected areas of the gloss film surface, wherein said matte ink composition comprises an oleoresinous compound; a matte agent to impart a matte finish; a cobalt drying agent to accelerate drying of the composition; and an etching agent to condition the gloss surface to promote adherence of the ink composition thereto, wherein said etching agent is selected from a group consisting of acetone, cyclohexanone, diacetone alcohol, ethyl acetate, isophorone, isopropyl acetate, methyl ethyl ketone, methyl iso-butyl ketone, n-butyl acetate, toluene, and xylene.

17. A method according to claim 16, wherein said plastic film is selected from the group consisting of polypropylene, polyester, and nylon.

18. A method according to claim 16, wherein said oleoresinous compound is present in said composition between about 75–90% by weight.

19. A method according to claim 16, wherein said matte agent is fumed silica.

20. A method according to claim 16, wherein said cobalt drying agent is present in said composition between about 0.1–10% by weight.

21. A method according to claim 16, wherein said etching agent is present in said composition between about 0.1–10% by weight.

* * * * *